(12) United States Patent
Pastrik et al.

(10) Patent No.: US 9,316,388 B2
(45) Date of Patent: Apr. 19, 2016

(54) DEVICE AND KIT FOR COOLING A LIGHT EMITTING MATERIAL

(71) Applicant: CHRISTIE DIGITAL SYSTEMS USA, INC., Cypress, CA (US)

(72) Inventors: Darren Pastrik, Kitchener (CA); Daniel Robert Adema, Kitchener (CA); David Cochrane, Toronto (CA); Graham Hill, Waterloo (CA)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 137 days.

(21) Appl. No.: 14/169,803

(22) Filed: Jan. 31, 2014

(65) Prior Publication Data

US 2015/0219330 A1    Aug. 6, 2015

(51) Int. Cl.
| | |
|---|---|
| *H01J 7/24* | (2006.01) |
| *F21V 29/70* | (2015.01) |
| *G02B 7/00* | (2006.01) |
| *G02B 26/00* | (2006.01) |
| *G03B 21/20* | (2006.01) |
| *F21V 29/502* | (2015.01) |
| *F21V 9/10* | (2006.01) |
| *F21V 14/08* | (2006.01) |

(52) U.S. Cl.
CPC . *F21V 29/70* (2015.01); *F21V 9/10* (2013.01); *F21V 14/08* (2013.01); *F21V 29/502* (2015.01); *G02B 7/006* (2013.01); *G02B 7/008* (2013.01); *G02B 26/008* (2013.01); *G03B 21/204* (2013.01)

(58) Field of Classification Search
CPC ............ F21V 29/70; F21V 29/83; H01J 1/66; H01J 1/70; H01J 29/24; H01J 29/28
USPC ....................................... 313/45, 46
See application file for complete search history.

(56) References Cited

U.S. PATENT DOCUMENTS

| | | |
|---|---|---|
| 6,814,445 B2 | 11/2004 | Kalyandurg et al. |
| 7,285,445 B2 | 10/2007 | Owen et al. |

(Continued)

FOREIGN PATENT DOCUMENTS

| | | |
|---|---|---|
| EP | 1475846 A2 | 11/2004 |
| WO | 2012077021 A1 | 6/2012 |

(Continued)

OTHER PUBLICATIONS

Corresponding European Patent Application No. 15152859 European Search Report dated Jun. 22, 2015; Examiner: Serbin, Jesper.

*Primary Examiner* — Andrew Coughlin
(74) *Attorney, Agent, or Firm* — Perry + Currier, Inc.

(57) ABSTRACT

A device and kit for cooling a light emitting material are provided. The device comprises: a light emitting material; a cooling plate configured to cool the light emitting material; a window, the light emitting material sandwiched between the window and the cooling plate, the window configured to: transmit excitation light for exciting the light emitting material; transmit emitted light from the light emitting material; and, conduct heat away from the light emitting material to the cooling plate. The kit comprises the window and a holder there for.

16 Claims, 8 Drawing Sheets

Perspective View

Cross-sectional Perspective View

(56) References Cited

U.S. PATENT DOCUMENTS

| | | |
|---|---|---|
| 7,819,556 B2 | 10/2010 | Heffington et al. |
| 7,938,543 B2 | 5/2011 | Gerets et al. |
| 2003/0020882 A1* | 1/2003 | Kalyandurg ....... G02B 26/0841 353/30 |
| 2005/0094689 A1 | 5/2005 | Ludewigt |
| 2006/0131601 A1 | 6/2006 | Ouderkirk et al. |
| 2012/0057364 A1 | 3/2012 | Kishimoto et al. |
| 2012/0119638 A1* | 5/2012 | Sato ................... F21V 29/004 313/46 |
| 2012/0230013 A1 | 9/2012 | Xu |

FOREIGN PATENT DOCUMENTS

| | | |
|---|---|---|
| WO | 2012124249 A1 | 9/2012 |
| WO | 2013023663 A1 | 2/2013 |

* cited by examiner

DEVICE AND KIT FOR COOLING A LIGHT EMITTING MATERIAL

FIELD

The specification relates generally to projection systems, and specifically to a device and kit for cooling a light emitting material.

BACKGROUND

Light emitting materials, such as phosphors, quantum dots and the like, generally have poor thermal conductivity. Hence, there can be a limit to the optical power (i.e. for excitation) that can be applied to the light emitting material, for example a laser illumination of a phosphor wheel (and the like), before the light emitting material becomes less efficient at converting light and/or fails. Such failure modes can include: light emitting materials, such as phosphor, becoming less efficient as they get hot; efficiency of the light emitting material being permanently damaged; and the light emitting material delaminating from a cooling plate and/or a heat sink and/or a backing plate. While a backing plate/cooling plate can remove some of the heat generated by the light emitting materials through conduction into the plate, and convection into air and/or another fluid, such systems are not efficient enough for high power/high brightness systems used in projectors.

SUMMARY

In general, this disclosure is directed to a device for thermally conducting heat away from a light emitting material, for example a phosphor, quantum dots and the like on a light emitting wheel. Such light emitting wheels (e.g. phosphor wheels) can be illuminated by high power lasers, and/or a plurality of low-power lasers, however excitation of the phosphor by the lasers, as well as absorption/dissipation of the laser light, generates more heat than a cooling plate can thermally remove via the interface between the phosphor and the cooling plate. This leads to the temperature of the phosphor and the cooling plate rising; as a coefficient of thermal expansion (CTE) of light emitting materials, such as phosphors, tend to be small compared to CTEs of materials used in cooling plates, such as aluminum: the two materials expand at different rates leading to thermal-mechanical failure of the light emitting material-to-cooling plate interface. Additional possible failure modes of increased light emitting material temperature is decreased light conversion efficiency and/or failure of the light emitting material. These failures are presently addressed by adding a thermally conductive optical window to the device, which thermally conducts heat from the light emitting material to the holder, which in turn conducts the heat to the backing plate; convective cooling is also increased. In some implementations a holder can be used to hold the window against the light emitting material and/or assist on conducting the heat from the window to the backing plate.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XYY, YZ, ZZ, and the like). Similar logic can be applied for two or more items in any occurrence of "at least one . . . " and "one or more . . . " language.

The present specification provides a device comprising: a light emitting material; a cooling plate configured to cool the light emitting material; a window, the light emitting material sandwiched between the window and the cooling plate, the window configured to: transmit excitation light for exciting the light emitting material; transmit emitted light from the light emitting material; and, conduct heat away from the light emitting material to the cooling plate.

The device can further comprise one of: a recess in the cooling plate, the light emitting material located in the recess so that respective surfaces of both the cooling plate and the light emitting material are flush with one another, and the window is in contact with both the light emitting material and the cooling plate; and, another recess in the window, the light emitting material located on a surface of the cooling plate and in the other recess of the window.

The window can be in contact with the cooling plate so that the heat flows directly from the window to the cooling plate.

The device can further comprise at least one of an epoxy and a glue between the window and the cooling plate, the at least one of the epoxy and the glue configured to bond the window to the cooling plate so that the heat flows from the window to the cooling plate.

The device can further comprise a holder configured to one or more of: hold the window against the light emitting material; hold the window in contact with the cooling plate; and, thermally connect the window to the cooling plate so that the heat flows from the window through the holder to the cooling plate. The holder can be configured to clamp the window against the light emitting material. The holder can comprise a frame for holding the window against the light emitting material along two or more sides of the window. The holder can comprise one or more clamps for clamping the window against the light emitting material along two or more sides of the window. The device can further comprise one or more fasteners configured to fasten the holder to the cooling plate.

The cooling plate can be configured to further cool the light emitting material from an interface between the cooling plate and the light emitting material.

The cooling plate can comprise one or more of a mirror, a reflecting surface and a polished surface for reflecting the emitted light towards the window.

The cooling plate can comprise one or more of a block, a wheel, a ring, and a water-block.

The device can further comprise one or more of a light emitting material wheel, a light emitting material ring, and a light emitting material plate.

The window can comprise one or more of diamond, calcium fluoride, and sapphire.

The window can comprise heat transfer surface features. The heat transfer surface features can be located outside an illumination area of the light emitting material. The heat transfer surface features can comprise one or more of a roughened surface of the window and micro-channels in the window.

The present specification further provides a kit comprising: a window for sandwiching a light emitting material between the window and a cooling plate, the window configured to: transmit excitation light for exciting the light emitting material; transmit emitted light from the light emitting material;

and, conduct heat away from the light emitting material; and, a holder configured to one or more of: hold the window against the light emitting material; hold the window in contact with the cooling plate; and, thermally connect the window to the cooling plate so that the heat flows from the window through the holder to the cooling plate.

The kit can further comprise one or more fasteners configured to fasten the holder to the cooling plate. The kit can further comprise one or more modification devices for modifying the cooling plate to accept the fasteners.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
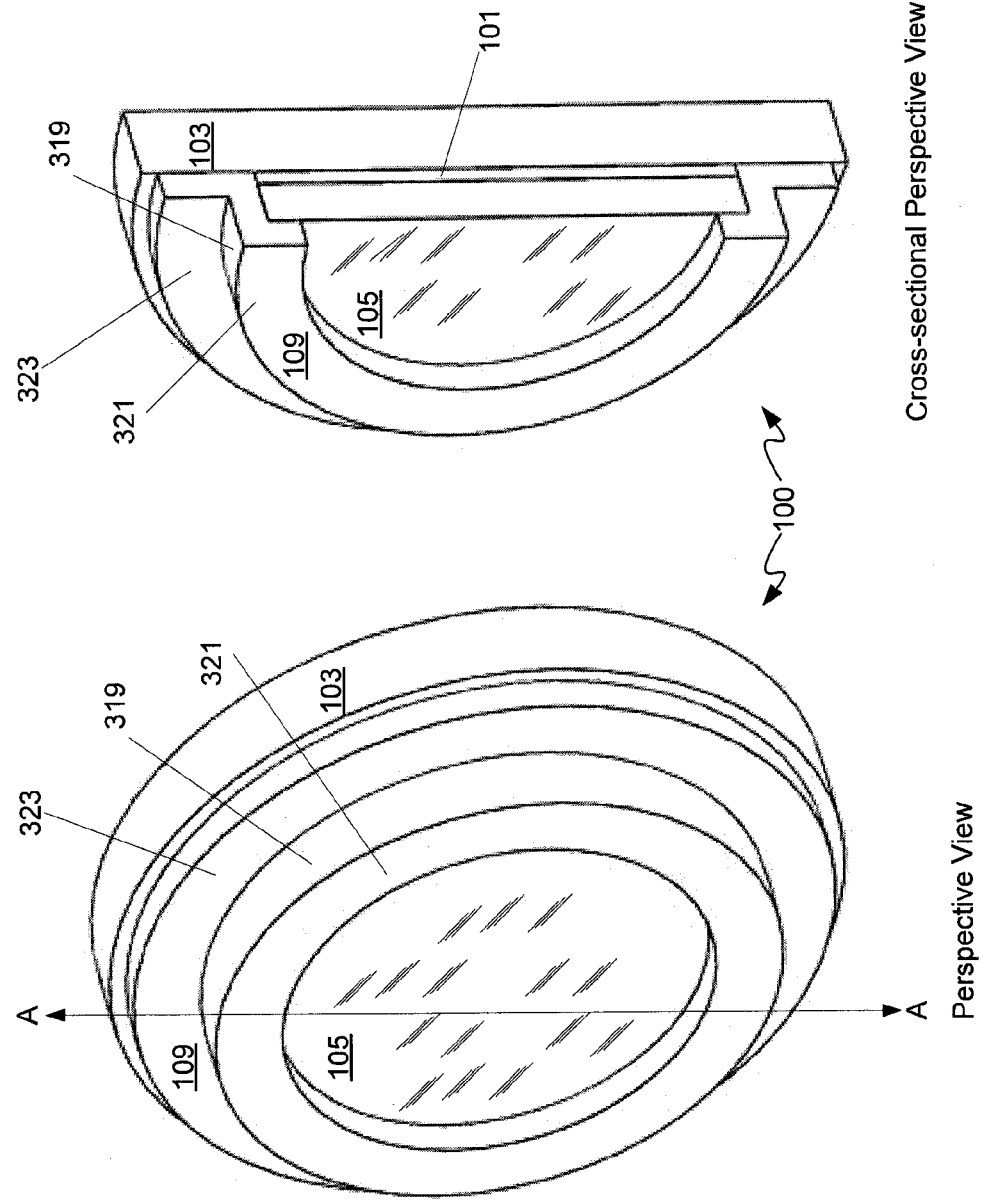
FIG. 1 depicts a perspective view of a device configured to cool a light emitting material, according to non-limiting implementations.
Figure 2:
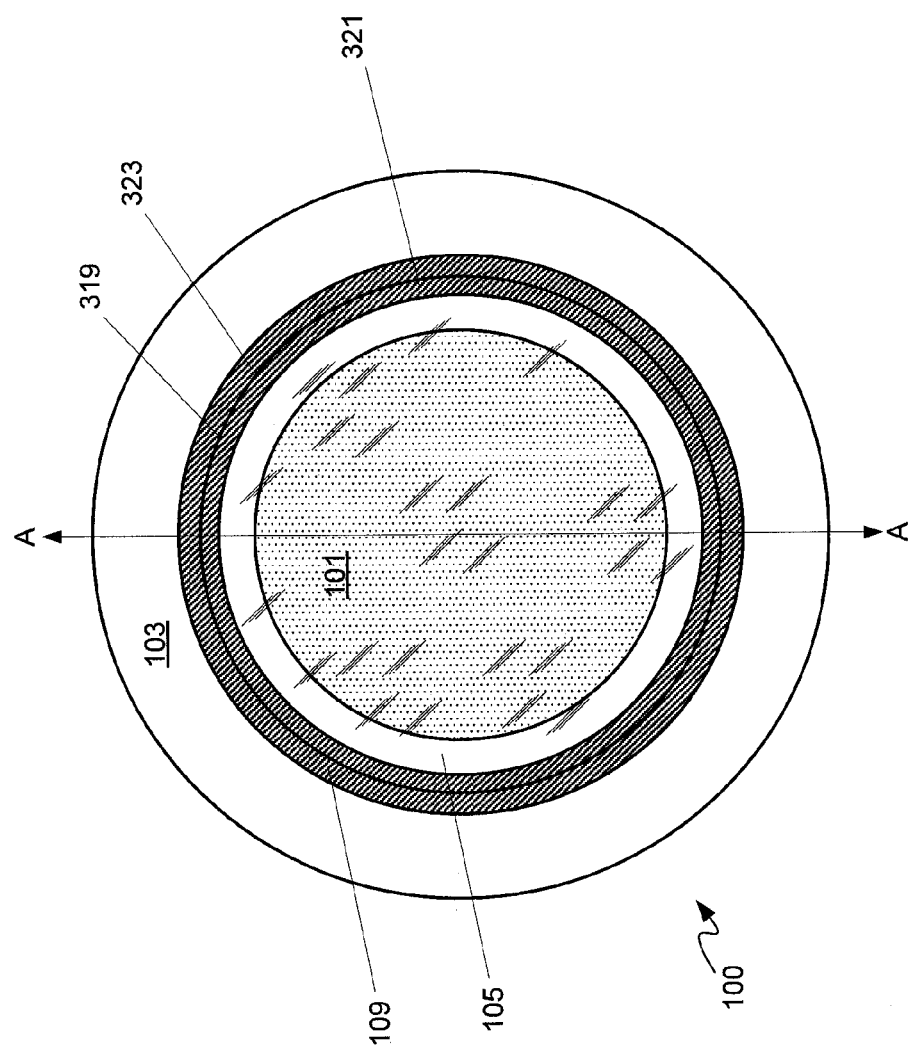
FIG. 2 depicts a front elevation view of the device of FIG. 1, according to non-limiting implementations.
Figure 3:
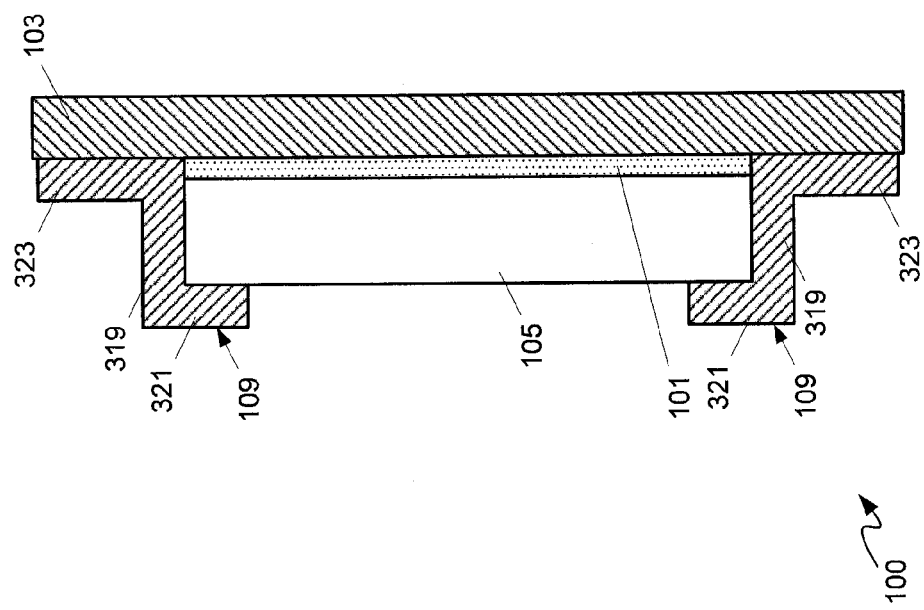
FIG. 3 depicts a cross-section of the device of FIG. 1 along a line A-A of FIG. 2, according to non-limiting implementations.

FIGS. 1, 2 and 3 depict a device 100 configured to cool a light emitting material. Specifically: FIG. 1 depicts a perspective view and a cross-sectional perspective view of device 100 through line A-A; FIG. 2 depicts a front elevation view of device 100; and FIG. 3 depicts a cross-section of device 100 through line A-A of FIG. 1. Device 100 comprises: a light emitting material 101; a cooling plate 103 configured to cool light emitting material 101; a window 105, light emitting material 101 sandwiched between window 105 and cooling plate 103 (as best seen in FIG. 3), window 105 configured to: transmit excitation light for exciting light emitting material 101; transmit emitted light from light emitting material 101; and, conduct heat away from light emitting material 101; and, a holder 109 for holding the window 105 against light emitting material 101, holder 109 thermally connecting window 105 to cooling plate 103 so that the heat flows from window 105 through holder 109 to cooling plate 103.

Light emitting material 101 can include, but is not limited to, one or more of a phosphor, a ceramic phosphor, quantum dots, a luminescent material, a fluorescent material, and the like; indeed, while present implementations will be described with regard to ceramic phosphors, other light emitting materials are within the scope of present implementations. Specifically, light emitting material 101 comprises any material that emits light of at least a first wavelength when excited by light of at least a second wavelength; in general, the first wavelength is longer than the second wavelength.

For example, in some implementations, light emitting material 101 can be configured for excitation by blue laser light, and emit light of a wavelength longer than the blue laser light, including, but not limited to, red light and green light. Further, in some implementations, light emitting material 101 comprises more than one light emitting material located, for example, in segments on cooling plate 103. For example, one or more segments of light emitting material 101 can emit red light, while one or more other segments of light emitting material 101 can emit green light. Hence, device 100 can be configured to one or more of move, and/or turn and/or translate so that the blue laser light, and the like interacts with the different segments of light emitting material 101.

While device 100 is depicted as generally circular, in other implementations, device 100 can be another shape. Device 100 can comprise one or more of a light emitting material wheel, a light emitting material ring, and a light emitting material plate. Indeed, while depicted as circular, device 100 is not so limited and can be any shape, including, but not limited to, annular, a block, and the like.

Device 100 can generally be used in a projection system (not depicted), in which, for example, blue laser light excites light emitting material 101, which emits red light and/or green light and/or yellow light, the blue laser light, the emitted light providing RGB (red-green-blue) light and/or white light to the projection system. Alternatively, light emitting material 101 can emit blue light in the RGB/white system. Furthermore, in other implementations, one or more components of device 100 can be annular; for example, while light emitting material 101 is depicted as circular, in other implementations, light emitting material 101 can be annular. Furthermore, cooling plate 103, and window 105 can also be annular. Holder 109 is generally annular, as depicted, to provide an aperture for window 105 (i.e. window 105 is located in an aperture of holder 109).

In general, the process of exciting light emitting material 101 to emit light results in the production of heat which is to be dissipated to prevent light emitting material 101 and cooling plate 103 from heating up. Hence, light emitting material 101 is located on cooling plate 103 which is configured to further cool light emitting material 101 from the interface between cooling plate 103 and light emitting material 101. Hence, cooling plate 103 generally comprises a material having thermal conduction properties for removing heat from light emitting material 101.

For example, light emitting material 101 can be bonded to cooling plate 103 at an interface there between using any suitable process and/or bonding material including, but not limited to, welding, soldering, annealing and the like, and epoxies, glues and the like. For example, in some implementations, light emitting material 101 can comprise a block of phosphor comprising a phosphorescent material dispersed in matrix material. Such a block can be bonded to cooling plate 103.

Heat then generally flows into cooling plate 103 from the interface between light emitting material 101 and cooling plate 103, the heat being dissipated at cooling plate 103. Hence, cooling plate 103 comprises one or more of a heat sink, a block, a wheel, a ring, and a water-block configured to cool light emitting material 101. Cooling plate 103 can comprise any material configured to cool light emitting material 101 including, but not limited to, metal, aluminum, steel and the like.

Further, in some implementations, cooling plate 103 can be about 1 mm thick, with a diameter in a range of about 40 mm to about 120 mm, and light emitting material 101 can be about 0.2 mm thick. However, other dimensions are within the scope of present implementations.

In some implementations, cooling plate 103 comprises a mirror and/or a reflective surface for reflecting the emitted light, and any non-absorbed laser light, from light emitting material 101 towards window 105. For example, light emitted from light emitting material 101 can be emitted in all directions, including towards cooling plate 103; hence cooling plate 103 can comprise a mirror, at least in an area of light emitting material 101, for reflecting emitted light impinging thereupon towards window 105 and/or away from cooling plate 103. Hence, cooling plate 103 can comprise a polished metal at least in the area of light emitting material 101.

In general, however, there is a thermal mismatch between light emitting material 101 and cooling plate 103. For example, ceramic phosphor materials can have a coefficient of thermal expansion (CTE) about 6 to 7 um/m-K, while cooling plate 103 generally comprises a metal, including but not limited to aluminum with a CTE of about 22 um/m-K. Hence, when the temperature of device 100 rises light emitting material 101 expands at a slower rate than cooling plate 103, which can lead to mechanical interface failure of device 100: i.e. light emitting material 101 can delaminate and the like from cooling plate 103. Such failure can occur under high light intensity conditions, for example when light impinging on light emitting material 101 is above a given intensity. Alternatively, heating of the phosphor and/or light emitting material can damage the light emitting properties thereof. While air cooling of light emitting material 101 can provide some additional cooling, it is generally insufficient to prevent such mechanical failure when light impinging on light emitting material 101 is above a given intensity.

To address this issue, in present implementations, light emitting material 101 is generally sandwiched between window 105 and cooling plate 103 so that heat also flows into window 105 from light emitting material 101, through window 105 into holder 109 and into cooling plate 103 from holder 109. Heat is further convectively dissipated from window 105.

Window 105 hence generally comprises a material that is both generally transparent and thermally conducting, including, but not limited to, one or more of diamond, calcium fluoride, sapphire, glass, and thermally conducting high temperature glass. In general, window 105 transmits: excitation light, i.e. blue laser light, so that the excitation light impinging on window 105 to light emitting material 101; and light emitted from light emitting material 101, so that light emitted from light emitting material 101 is transmitted through window 105 to be collected by one or more of optics, projection optics, collection optics, and the like, so that images can be formed there from.

While not depicted, in some implementations, window 105 further comprises heat transfer surface features, at an outer surface of window 105 (i.e. a side opposite light emitting material 101), the heat transfer surface features configured to increase convective heat dissipation and/or increase heat conduction from window 105 to holder 109. In some of these implementations, the heat transfer surface features are located outside an illumination area of light emitting material 101 so as to not interfere with transmission of light through window 105. For example, such heat transfer surface features can comprise one or more of a roughened surface of window 105 and channels and/or micro-channels and/or grooves and/or micro-grooves in window 105, and be located away from an area of light emitting material where a laser, and/or other excitation light, interacts with light emitting material 101. The window 105 can further provide an environmental sealing surface for the phosphor.

Holder 109 can comprise a material similar to cooling plate 103 to conduct heat from window 105 to cooling plate 103. Hence, in general, at least of a portion of holder 109 one or more of overlaps window 105 and contacts window 105, and at least another portion of holder 109 one or more of contacts cooling plate 103. As best seen in FIG. 3, holder 109 comprises a side wall 319, a first lip 321 extending generally perpendicular from an inner side of side wall 319, and a second lip 323 extending generally perpendicularly from an outer side of side wall 319, first lip 321 and side wall 319 forming a frame and/or receptacle for containing window 105 and light emitting material 101, and second lip 323 configured for interfacing and/or contact with cooling plate 103. First lip 321 and side wall 319 are configured for interfacing and/or contact with at least window 105. First lip 321 and side wall 319 are further configured to remove heat from window 105.

As depicted, device 100 is generally circular, as are window 105 and light emitting material 101. Hence, in these implementations, holder 109 can comprise an annular holder such that window 105 is received in a complementary receptacle of holder 109, holder 109 comprising an aperture that is filled by window 105 when window 105 is received in holder 109. For example, holder 109 can comprise a frame for holding window 105 against light emitting material 101 along at least a portion of window 105, an aperture formed by first lip 321.

Further, while, as depicted, holder 109 comprises a single integrated piece, in other implementations, holder 109 can comprise one or more pieces for holding window 105 against cooling plate 103. In other words, holder 109 can comprise several pieces, each configured to hold window 105 against light emitting material 101 in tandem.

Further, holder 109 can be generally configured to clamp window 105 against light emitting material 101, to improve thermal contact there between. Hence, while not depicted, holder 109 can comprise one or more clamps for clamping window 105 against light emitting material 101 along at least a portion of window 105. For example holder 109 can comprise one or more clamps that fit around a portion of holder 109 (e.g. second lip 323 and/or first lip 321) and a back side of cooling plate 103 to clamp holder 109 against cooling plate 103 and in turn clamp window 105 against light emitting material.

Alternatively, and/or in addition, to such clamps, device 100 can further comprise one or more fasteners configured to fasten holder 109 to cooling plate 103. For example, cooling plate 103 can be adapted to receive one or more screws, bolts and the like, for example by providing cooling plate 103 with one or more of holes and/or threaded holes for receiving the one or more screws, bolts and the like, for example in second lip 323; holder 109 can further comprise complimentary holes for receiving the one or more screws, bolts and the like there through, such that the one or more screws, bolts and the like can be fitted through the complimentary holes (e.g. in second lip 323) and into the holes in cooling plate 103 to fasten the holder 109 thereto.

Figure 4:
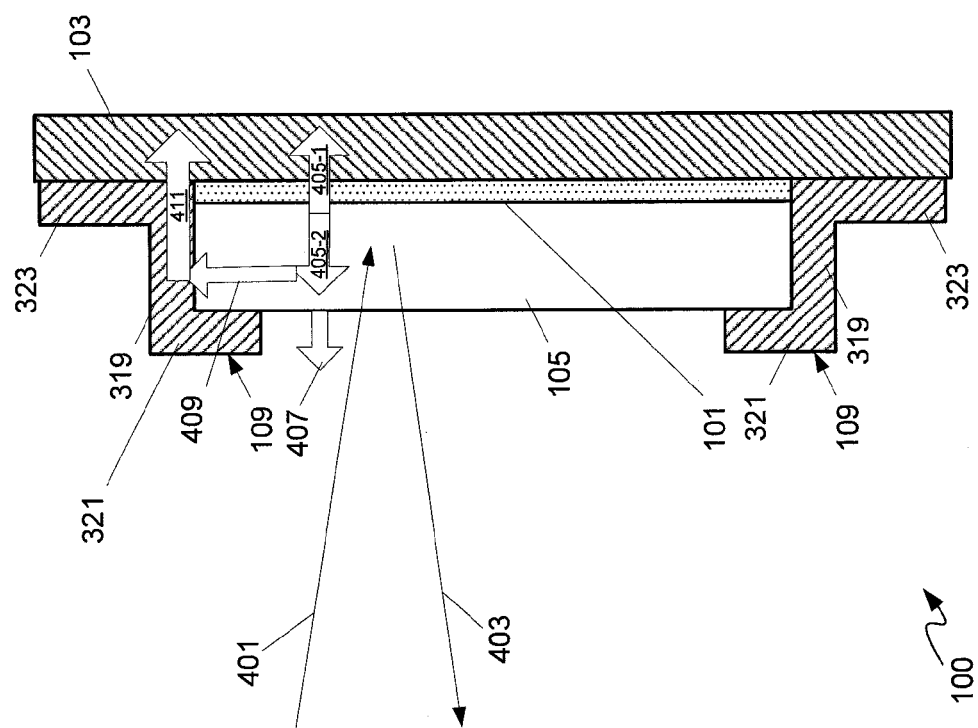
FIG. 4 depicts the device of FIG. 1 in operation, according to non-limiting implementations.

FIG. 4 depicts device 100 in operation and is otherwise substantially similar to FIG. 3, with like elements having like numbers. Excitation light 401 impinges on light emitting material 101, through window 105. In other words, window 105 is generally transparent to excitation light 401, for example blue laser light and the like. In response, light emitting material 101 is excited and emits light 403, through window 105. While not depicted, a portion of light 403 can be emitted towards cooling plate 103, which can, in some implementations, reflect light 403 through window 105. In general light 403 is collected by optics (not depicted) for use in an optical system including, but not limited to, a projection system. Further, device 100 can be moving and/or turning and/or translating so that light 401 is directed to different areas of light emitting material 101 and to disperse heat production across the area of light emitting material 101.

In any event, heat 405-1, 405-2 is produced by light emitting material 101 during production and/or emission of light 403, generally at a location where excitation light 401 is interacting with light emitting material 101, though, for clarity, heat 405-1, 405-2 is depicted as offset from such a location in FIG. 4. While heat 405-1, 405-2 are depicted as distinct from one another, and also distinctly flowing in opposite directions, it is appreciated that heat can generally flow in all directions from the location where excitation light 401 is interacting with light emitting material 101. Hence, heat 405-1, 405-2 can interchangeably be referred to hereafter as heat 405.

In any event, heat 405-1 flows into cooling plate 103 via an interface between light emitting material 101 and cooling plate 103, while heat 405-2 flows into window 105. A portion 407 of heat 405-2 is dissipated in air (and/or another fluid), while another portion 409 is conducted by window 105 to holder 109 (e.g. to first lip 321 and/or side wall 319), where a portion (not depicted) is again dissipated in air, while a further portion 411 is thermally conducted by holder 109 into cooling plate 103 (e.g. through side wall 319 to second lip 323 and into cooling plate 103).

While portion 409 of heat 405-2 is depicted as flowing towards one side of holder 109, it is appreciated that portion 409 of heat 405-2 can flow in all directions in window 105 towards holder 109, and be assisted by any heat transfer surface features in window 105. Such heat transfer surface features further assist with convective heat transfer to air.

Heat 405-1 and portion 411 of heat 405-2 are hence both dissipated at cooling plate 103, which is generally more efficient than air cooling combined with rear cooling of light emitting material 101 by cooling plate 103 alone, presuming that window 105 were not present at device 100.

Furthermore, portion 407 of heat 405-2 can include at least some of portion 409 as it is conducted towards holder 109; hence, window 105 also serves to increase the area of convective cooling of light emitting material 101.

Persons skilled in the art will appreciate that there are yet more alternative implementations and modifications possible. For example, in some alternative implementations, holder 109 can also comprise surface heat transfer features, including but not limited to roughened outer surface of holder 109 and micro-channels in an outer surface of holder 109. Such surface heat transfer features can increase convective heating to air at holder 109. Such surface heat transfer functions can be located at one or more of an outer surface of side wall 319, an outer surface of first lip 321 and an outer surface of second lip 323. It is appreciated that "an outer surface" is a surface opposite a surface in contact with window 105 and/or cooling plate 103.

Figure 5:
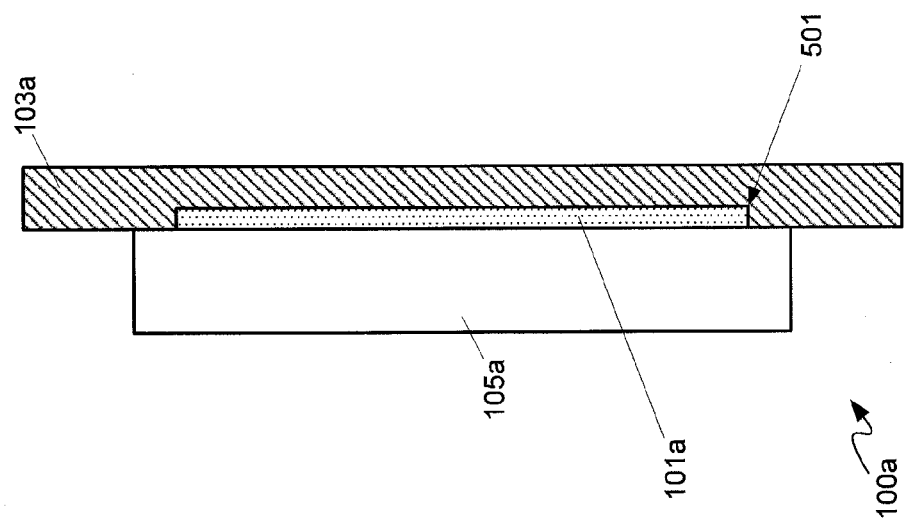
FIG. 5 depicts a cross-section of a device configured to cool a light emitting material, according to non-limiting implementations.

Attention is next directed to FIG. 5 which depicts a cross-section of a device 100a, similar to device 100, however lacking a holder. FIG. 5 is otherwise similar to FIG. 3, with like elements having like numbers, but with an "a" appended thereto. Device 100a comprises: a light emitting material 101a; a cooling plate 103a configured to cool light emitting material 101a; a window 105a, light emitting material 101a sandwiched between window 105a and cooling plate 103a, window 105a configured to: transmit excitation light for exciting light emitting material 101a; transmit emitted light from light emitting material 101a; and, conduct heat away from light emitting material 101a to cooling plate 103a. In these implementations, device 100a further comprises at least one of an epoxy and a glue between window 105a and cooling plate 103a, the at least one of the epoxy and the glue configured to bond window 105a to cooling plate 103a so that the heat flows from window 105a to cooling plate 103a.

In other words, device 100a is similar to device 100, though device 100a is lacking a holder. Further, device 100a comprises a recess 501 in cooling plate 103a, light emitting material 101a located in recess 501 so that respective surfaces of both cooling plate 103a and light emitting material 101a are flush with one another, and window 105a is in contact with both light emitting material 101a and cooling plate 103a. In other words, cooling plate 103a comprises recess 501 that is a depth similar to a thickness of light emitting material 101a so that an outward facing surface of light emitting material 101a is flush with an adjacent surface of cooling plate 103a. Further recess 501 can be a shape that is complimentary to light emitting material 101a.

In these implementations, window 105a has a larger diameter and/or radius than light emitting material 101a (and/or has outer edges that extend past light emitting material 101a and recess 501) so that window 105a both covers light emitting material 101a and at least partially overlaps cooling plate 103a. In some implementations, outer edges of window 105a can extend to about the respective outer edges of cooling plate 103a. The epoxy and/or glue is hence located between window 105a and cooling plate 103a in the area where window 105a at least partially overlaps cooling plate 103a.

Hence, window 105a is one or more of in contact and in thermal contact with cooling plate 103a so that heat flows directly from window 105a to cooling plate 103a without an intervening holder, as in device 100.

In other words, heat generated at light emitting material 101a flows from light emitting material 101a to cooling plate 103a via recess 501, and into window 105a; heat that flows into window 105a can be dissipated into air (and/or another cooling fluid) and further flows through window 105a into cooling plate 103a.

Figure 6:
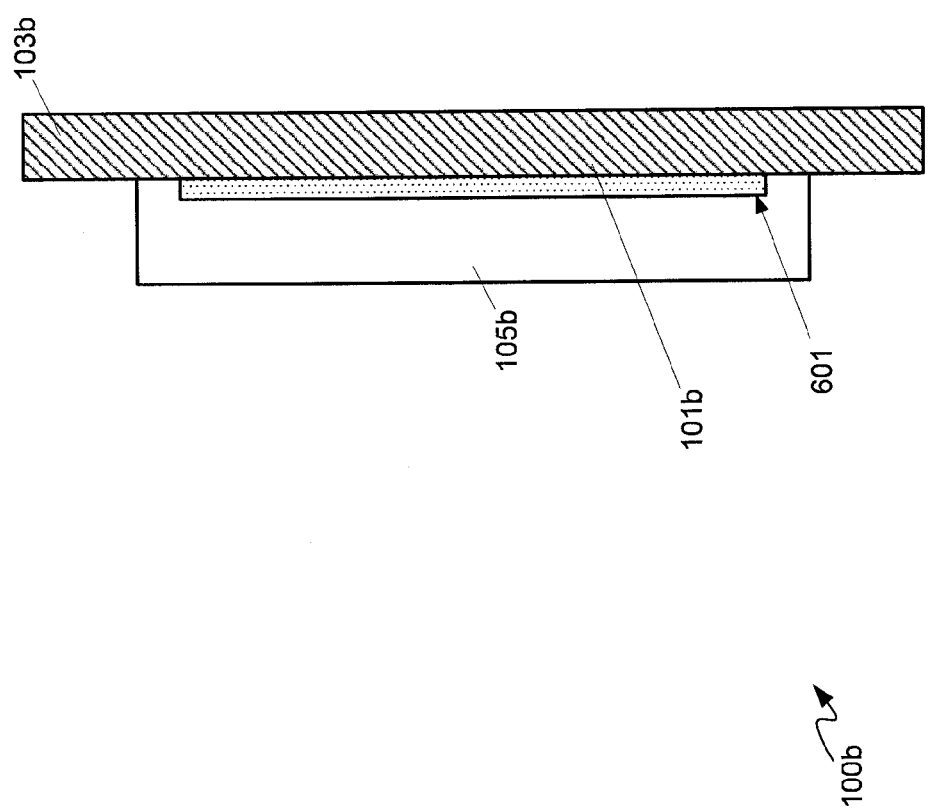
FIG. 6 depicts a cross-section of a device configured to cool a light emitting material, according to non-limiting implementations.

Attention is next directed to FIG. 6 which depicts a cross-section of a device 100b, similar to device 100a; FIG. 6 is similar to FIG. 5, with like elements having like numbers, but with a "b" appended thereto rather than an "a". Device 100b comprises: a light emitting material 101b; a cooling plate 103b configured to cool light emitting material 101b; a window 105b, light emitting material 101b sandwiched between window 105b and cooling plate 103b, window 105b configured to: transmit excitation light for exciting light emitting material 101b; transmit emitted light from light emitting material 101b; and, conduct heat away from light emitting material 101b to cooling plate 103b. In these implementations, as in device 100a, device 100b further comprises at least one of an epoxy and a glue between window 105b and cooling plate 103b, the at least one of the epoxy and the glue configured to bond window 105b to cooling plate 103b so that the heat flows from window 105b to cooling plate 103b.

In other words, device 100b is similar to device 100a, however device 100b comprises a recess 601 in window 105b (i.e. rather than in cooling plate 103b, as in device 100a), light emitting material 101b located on a surface of cooling plate 103b and in recess 601 of window 105b. Recess 601 that is a depth similar to a thickness of light emitting material 101b so that an inward facing surface of light emitting material 101b is flush with an adjacent surface of window 105b. Further recess 601 can be a shape that is complimentary to light emitting material 101b.

Hence, light emitting material 101b located in recess 601 so that respective surfaces of both window 105b and light emitting material 101b are flush with one another, and window 105b is in contact with both light emitting material 101b and cooling plate 103b.

In these implementations, window 105a both covers light emitting material 101b and at least partially overlaps cooling plate 103b. In some implementations, outer edges of window 105b can extend to about the respective outer edges of cooling plate 103b. The epoxy and/or glue is hence located between window 105b and cooling plate 103b in the area where window 105b at least partially overlaps cooling plate 103b.

Hence, window 105b is one or more of in contact and in thermal contact with cooling plate 103b so that heat flows directly from window 105b to cooling plate 103b without an intervening holder, as in device 100.

In other words, heat generated at light emitting material 101b flows from light emitting material 101b to cooling plate 103b, and into window 105b via recess 601; heat that flows into window 105b can be dissipated into air (and/or another cooling fluid) and further flows through window 105b into cooling plate 103b.

Figure 7:
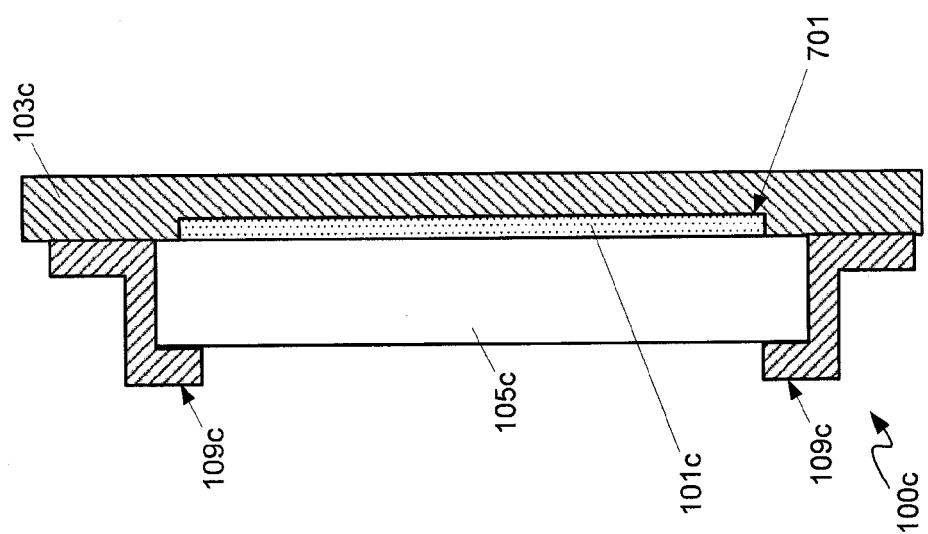
FIG. 7 depicts a cross-section of a device configured to cool a light emitting material, according to non-limiting implementations.

Attention is next directed to FIG. 7 which depicts a cross-section of a device 100c, similar to device 100a; FIG. 7 is similar to FIG. 5, with like elements having like numbers, but with a "c" appended thereto rather than an "a". Device 100c comprises: a light emitting material 101c; a cooling plate 103c configured to cool light emitting material 101c; a window 105c, light emitting material 101c sandwiched between window 105c and cooling plate 103c, window 105c configured to: transmit excitation light for exciting light emitting material 101c; transmit emitted light from light emitting material 101c; and, conduct heat away from light emitting material 101c to cooling plate 103c. As in device 100a, device 100c further comprises a recess 701, similar to recess 501, in cooling plate 103c. Further, window 105c at least partially overlaps cooling plate 103c.

However, in contrast to device 100a, but similar to device 100, device 100c further comprises a holder 109c (which can be similar holder 109) configured to one or more of: hold window 105c against light emitting material 101c; hold window 105c in contact with cooling plate 103c; and, thermally connect window 105c to cooling plate 103c so that the heat from window 105c flows from window 105c through holder 109c to cooling plate 103c. However, in contrast to device 100, window 105c is in contact with cooling plate 103c, as is holder 109c. Hence, heat can flow from window 105c into cooling plate 103c, as well from window 105c, into holder 109c, and into cooling plate 103c. Convective cooling can also occur at window 105c and/or at holder 109c. Hence, holder 109c obviates the use of glue, epoxy and the like for attaching window 105c to cooling plate 103c, though glue, epoxy and the like can still be present in device 100c, for example, to both provide a second method of attaching window 105c to cooling plate 103c, and to seal light emitting material 101c between window 105c and cooling plate 103c.

As in device 100, device 100c can further comprise fasteners, clamps and the like for fastening and/or clamping holder 109c to cooling plate 103c.

It is appreciated that device 100c comprises device 100a adapted for use with holder 109c.

It is further appreciated that, while not depicted, device 100b can be similarly adapted and device 100b can also comprise a holder similar to holder 109c.

Figure 8:
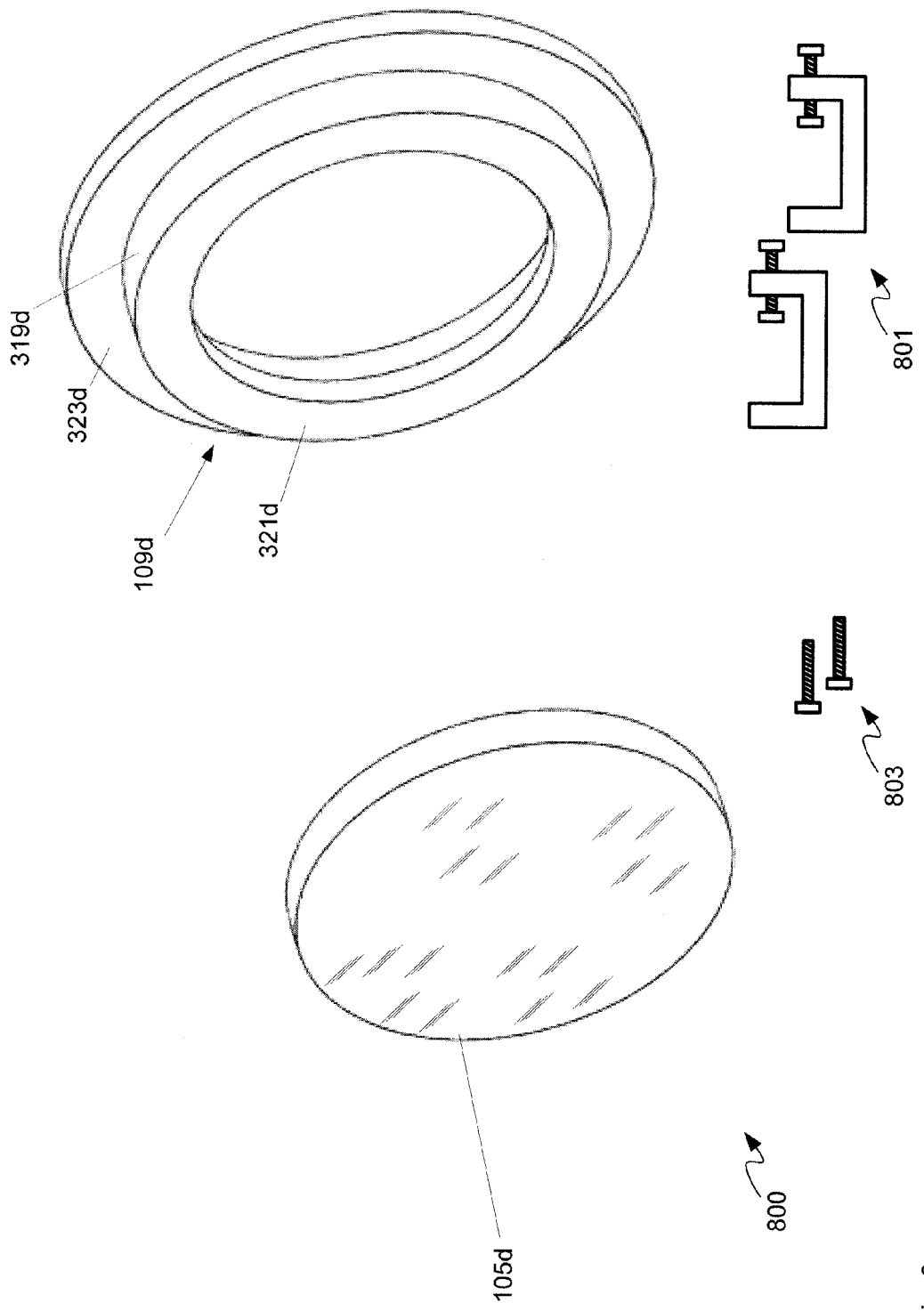
FIG. 8 depicts a kit for adapting a light emitting material on a cooling plate to more efficiently dissipate heat, according to non-limiting implementations.

Attention is next directed to FIG. 8, which depicts a kit 800 for adapting a light emitting material on a cooling plate to more efficiently dissipate heat. Specifically, kit 800 comprises: a window 105d, similar to window 105 (and/or windows 105a, 105b, 105c), for sandwiching a light emitting material between window 105d and a cooling plate, window 105d configured to: transmit excitation light for exciting the light emitting material; transmit emitted light from the light emitting material ; and, conduct heat away from the light emitting material; and, a holder 109d, similar to holder 109 (and/or holder 109c) configured to one or more of: hold window 105d against the light emitting material; hold window 105d in contact with the cooling plate; and, thermally connect window 105d to the cooling plate so that the heat flows from window 105dthrough holder 109d to the cooling plate. As depicted, holder 109d can further comprise clamps 801, and the like, for clamping holder 109d to the cooling plate.

Similar to holder 109, holder 109d comprises a side wall 319d, a first lip 321d extending generally perpendicular from an inner side of side wall 319d, and a second lip 323d extending generally perpendicularly from an outer side of side wall 319d, first lip 321d and side wall 319d forming a frame and/or receptacle for containing window 105d and a light emitting material located on a cooling plate, and second lip 323d configured for interfacing with a cooling plate. First lip 321d and side wall 319d are configured for interfacing with at least window 105d. First lip 321d and side wall 319d are further configured to remove heat from window 105d.

One or more of window 105d and holder 109d can further comprise surface heat transfer features, including but not limited to a roughened outer surface of one or more of window 105d and holder 109d and micro-channels in an outer surface of one or more of window 105d and holder 109d. Such surface heat transfer functions can increase convective heating to air at window 105d and/or holder 109d. Such surface heat transfer features at window 105d can be located outside of an illumination area of window 105d. Surface heat transfer features at holder 109d can be located at one or more of an outer surface of side wall 319d, an outer surface of first lip 321d and an outer surface of second lip 323d. It is appreciated that "an outer surface" is a surface opposite a surface configured for contact with window 105d and/or a cooling plate.

In some implementations, kit 800 can further comprise one or more fasteners 803 configured to fasten holder 109d to the cooling plate. In some of these implementations, kit 800 can further comprise one or more modification devices for modifying the cooling plate to accept the fasteners, including, but not limited to, one or more drill bits and/or one or more taps for drilling and/or tapping a hole in the cooling plate to accept the fasteners.

In other words, kit 800 is generally similar to device 100 without light emitting material 101 and cooling plate 103, and is generally configured to adapt the combination of light emitting material 101 and cooling plate 103 to accept window 105d and holder 109d.

While window 105d and holder 109d are depicted as circular, similar to window 105 and holder 109, in other implementations, window 105d and holder 109d can be adapted to any geometry complimentary to a geometry of a given light emitting material and cooling plate.

Hence, provided herein is a device which provides configured to cool of a light emitting material by using the thermal conduction properties of transparent materials to specifically draw heat away from a "front" side of light emitting material, for example a side opposite a cooling plate in a phosphor wheel. In other words, a thermally conductive optical window is added adjacent to a light emitting material and/or a phosphor to provide an additional conduction path for increased heat transfer out of the light emitting material/phosphor, i.e. in addition to the conduction path to the cooling plate. The optical window can conduct heat either to the same cooling plate that the light emitting material/phosphor is mounted to, and/or increases the effective area for convective heat transfer.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A device comprising:
a light emitting wheel comprising:
   a light conversion material comprising one or more of a phosphor, a ceramic phosphor, quantum dots, a luminescent material, and a fluorescent material;
   a cooling plate configured to cool the light conversion material, the cooling plate comprising a material having thermal conduction properties for removing heat from light conversion material, the light conversion material and the cooling plate having a thermal mismatch, the light conversion material expanding at a slower rate than the cooling plate when a temperature of the light emitting wheel rises; and,
a kit comprising:
   a window configured to sandwich the light conversion material between the window and the cooling plate, the window configured to:
      transmit excitation light for exciting the light conversion material, the light conversion material emitting light when excited by the excitation light;
      transmit emitted light from the light conversion material; and,
      conduct heat away from the light conversion material to the cooling plate;
   a holder configured to: hold the window against the light conversion material; and, thermally connect the window to the cooling plate so that the heat flows from the window through the holder to the cooling plate, the holder further comprising: a frame for holding the window against the light conversion material along two or more sides of the window; and a lip and a side wall configured to conduct the heat from window to the cooling plate, the holder comprising a material similar to the material of the cooling plate; and,
   at least one of : one or more clamps that fit around a portion of the holder and a back side of cooling plate to clamp the holder against the cooling plate and in turn clamp the window against the light conversion material; and one or more fasteners configured to fasten the holder to the cooling plate.

2. The device of claim 1, further comprising:
a recess in the window complementary to the light conversion material the light conversion material located on a surface of the cooling plate, the recess configured to receive the light conversion material therein when the kit is attached to the light emitting wheel.

3. The device of claim 1, wherein the window is configured to contact the cooling plate so that the heat flows directly from the window to the cooling plate when the kit is attached to the light emitting wheel.

4. The device of claim 1, wherein the kit further comprises at least one of an epoxy and a glue configured to bond the window to the cooling plate so that the heat flows from the window to the cooling plate when the kit is attached to the light emitting wheel.

5. The device of claim 1, wherein the holder is configured to clamp the window against the light conversion material.

6. The device of claim 1, wherein the holder comprises a frame for holding the window against the light conversion material along two or more sides of the window.

7. The device of claim 1, wherein the holder comprises one or more clamps for clamping the window against the light conversion material along two or more sides of the window.

8. The device of claim 1, wherein the kit further comprises one or more fasteners configured to fasten the holder to the cooling plate.

9. The device of claim 8, wherein the kit further comprises one or more modification devices for modifying the cooling plate to accept the fasteners.

10. The device of claim 1, wherein the cooling plate is configured to further cool the light conversion material from an interface between the cooling plate and the light conversion material.

11. The device of claim 1, wherein the cooling plate comprises a mirror for reflecting the emitted light towards the window.

12. The device of claim 1, wherein the cooling plate comprises one or more of a block, a wheel, a ring, and a waterblock.

13. The device of claim 1, wherein the window comprises one or more of diamond, calcium fluoride, and sapphire.

14. The device of claim 1, wherein the window comprises heat transfer surface features.

15. The device of claim 14, wherein the heat transfer surface features are located outside an illumination area of the light emitting material.

16. The device of claim 14, wherein the heat transfer surface features comprises one or more of a roughened surface of the window and micro-channels in the window.

* * * * *